(12) United States Patent
Woehrle et al.

(10) Patent No.: US 7,122,275 B2
(45) Date of Patent: Oct. 17, 2006

(54) ELECTROCHEMICAL ELEMENT

(75) Inventors: Thomas Woehrle, Ellwangen (DE); Winfried Gaugler, Ellwangen (DE); Wolf-Ulrich Barenthin, Roehlingen (DE); Heinrich Stelzig, Rosenberg (DE); Dejan Ilic, Ellwangen (DE)

(73) Assignee: Varta Microbattery GmbH, (DE)

( * ) Notice: Subject to any disclaimer, the term of this patent is extended or adjusted under 35 U.S.C. 154(b) by 388 days.

(21) Appl. No.: 10/454,231

(22) Filed: Jun. 4, 2003

(65) Prior Publication Data
US 2003/0228515 A1 Dec. 11, 2003

(30) Foreign Application Priority Data
Jun. 6, 2002 (DE) .................................. 102 25 041

(51) Int. Cl.
*H01M 2/26* (2006.01)
*H01M 2/08* (2006.01)

(52) U.S. Cl. ....................... 429/159; 429/160; 429/161; 429/184

(58) Field of Classification Search ................ 429/152, 429/153, 154, 159, 160, 161, 162, 180, 181, 429/184
See application file for complete search history.

(56) References Cited
U.S. PATENT DOCUMENTS

| | | | |
|---|---|---|---|
| 3,674,565 A * | 7/1972 | Bergum et al. ............. | 429/152 |
| 5,460,904 A | 10/1995 | Gozdz et al. ............... | 429/316 |
| 5,705,297 A | 1/1998 | Warren ........................ | 429/244 |
| 6,475,674 B1 * | 11/2002 | Xing et al. ............. | 429/181 X |
| 6,531,246 B1 * | 3/2003 | Hanafusa et al. ........... | 429/162 |
| 6,797,430 B1 * | 9/2004 | Hatta et al. ............. | 429/162 X |
| 6,849,358 B1 * | 2/2005 | O'Connell .............. | 429/161 X |
| 6,902,844 B1 * | 6/2005 | Yageta et al. ........... | 429/162 X |

FOREIGN PATENT DOCUMENTS

| | | |
|---|---|---|
| EP | 1 202 371 A1 | 5/2002 |
| JP | 2003257409 | 9/2003 |

* cited by examiner

Primary Examiner—Stephen J. Kalafut
(74) Attorney, Agent, or Firm—DLA Piper

(57) ABSTRACT

An electrochemical element which contains a stack including two or more individual cells with positive and negative electrodes as well as separators in a housing formed from a metal sheet which is coated on the inside with insulating material. The output conductor lugs of each polarity are welded to a collector. The collector forms an external electrical connection of the electrochemical element. Those areas of the output conductor lugs and the collector which are welded to them, point towards the housing internal wall and are adjacent to the housing wall and are covered with a plastic film. The plastic film is adhesively bonded to the output conductor and to the collector with a silicone adhesive layer and is composed, for example, of polyimide.

14 Claims, 1 Drawing Sheet

ELECTROCHEMICAL ELEMENT

RELATED APPLICATION

This application claims priority of German Patent Application No. 102 25 041.3, filed Jun. 6, 2002.

FIELD OF THE INVENTION

This invention relates to an electrochemical element which contains a stack comprising two or more individual cells with positive and negative electrodes as well as separators in a housing formed from a composite sheet which is coated with insulating material on the inside.

BACKGROUND

Rechargeable electrochemical elements, in particular lithium cells, in many cases contain a cell stack which is formed from two or more individual cells or individual elements. The individual cells from which such a cell stack is formed are a laminate, which is produced from output conductors, an active electrode film and a separator. Laminates such as these composed of firmly connected individual parts are produced, in particular, as so-called "bicells" with possible sequences comprising a negative electrode/separator/positive electrode/separator/negative electrode or a positive electrode/separator/negative electrode/separator/positive electrode.

A method for producing rechargeable lithium/ion batteries is described in U.S. Pat. No. 5,460,904. In this method, active materials and additives such as, if required, conductivity improvers are mixed in the electrodes or stabilizers in the separator, a specific copolymer, polyvinylidenefluoride hexafluoropropylene (PVDF-HFP), as well as components of a softener, in many cases dibutylphthalate (DBP), after the addition of acetone to dissolve the copolymer, and are drawn out to form a sheet. The electrode sheets and separator sheets are processed in a number of lamination processes to form the above-mentioned bicells. Two or more bicells are formed in layers into a stack which, after insertion into a container composed, for example, of a thermoformed or deep-drawn composite aluminium sheet, filled with electrolyte, sealed with a cover, formation and end closure, are processed to form a complete battery. The electrodes of each polarity are provided with output conductor lugs welded to a collector which is passed through the housing to the exterior. The output conductors are folded closely together to save space and obtain a high energy density in the electrochemical element. It has been found that, in cells such as these, short circuits frequently occur as a result of contact between the output conductor lugs and the metal of the outer composite aluminium sheet.

It would, therefore, be advantageous to improve the resistance of such electro-chemical elements to short circuits.

SUMMARY OF THE INVENTION

This invention relates to an electrochemical element including a housing formed from a metal sheet coated with an insulating material, two or more individual cells positioned in the housing as a stack and formed from positive and negative electrodes having output conductor connections and separators interposed between the positive and negative electrodes, and collector connections extending outwardly of the housing, wherein output conductor connections of the same polarity are each connected to one of the collector connections, and the output conductor connections adjacent to the housing and the collector connection which is connected to the output conductor connections have areas oriented towards an inner face of the housing and are at least partially coated with a plastic layer.

DETAILED DESCRIPTION

Figure 1:
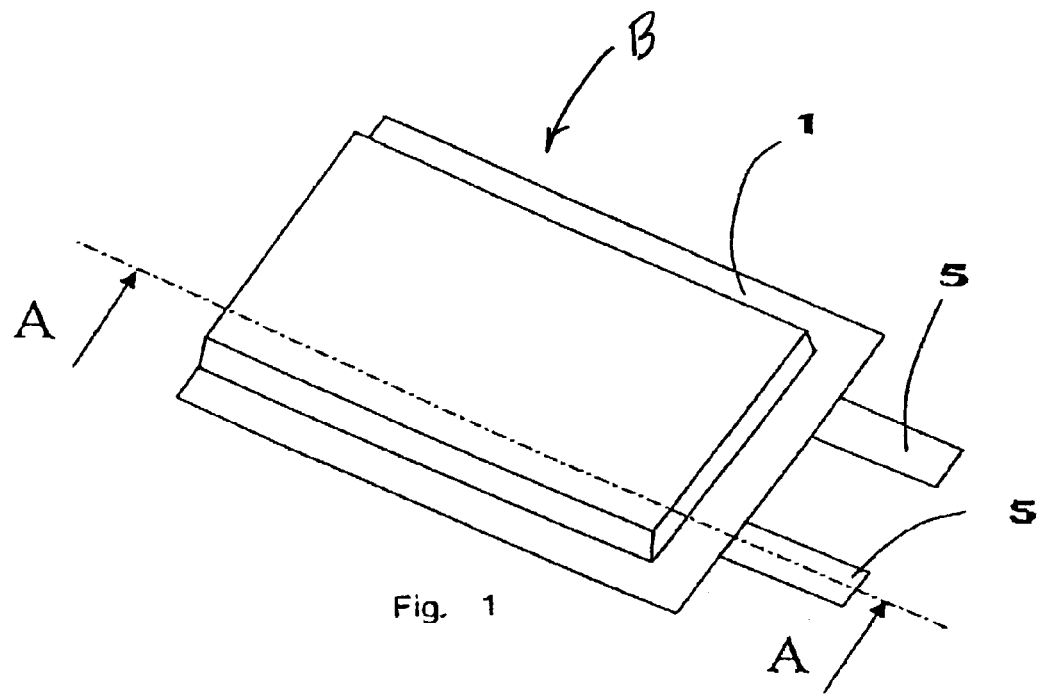
FIG. 1 is a schematic perspective view of a flat cell (soft pack) in accordance with aspects of the invention.

It will be appreciated that the following description is intended to refer to specific embodiments of the invention selected for illustration in the drawings and is not intended to define or limit the invention, other than in the appended claims.

In the case of an electrochemical element according to the invention, the output conductor connections of each polarity are welded to a collector which forms the external electrical connection of the cell. Those areas of the output conductor lugs (which are adjacent to the housing wall) and of the collector which point towards the inside of the housing are covered with a plastic layer or a plastic film. A plastic film can be adhesively bonded to the output conductor and the collector by a silicone layer. At least one of the electrodes is preferably a lithium-intercalating electrode.

The plastic layer may be composed of polyethylene (PEA), polypropylene (PP), polyimide (PI), polyethyleneterephthalate (PET), PVC, PDFE or the like. The thickness of the plastic layer may be about 10 µm to about 100 µm, advantageously about 20 µm to about 60 µm or about 40 µm.

These and further features are evident not only from the claims but also from the description and from the drawings, with the individual features in each case being implemented on their own or two or more of them being implemented together in the form of subcombinations for one embodiment of the invention and in other fields, and being able to represent advantageous embodiments, which are patentable in their own right, and for which protection is claimed here. The subdivision of the application into individual sections as well as intermediate headings does not restrict the generality of the statements made in these sections and under these headings.

The subject matter of the invention will be explained in more detail in the following text with reference to FIGS. 1 and 2.

The battery B contains, by way of example, seven or eight individual cells in a housing composed of a composite sheet 1, for example, a composite aluminium sheet. The composite sheet 1 is provided with a plastic coating, as insulation, at least on the surface which is oriented towards the inside of the cell.

The individual cells comprise positive electrodes 2 which may be aluminum, negative electrodes 3 which may be copper and separators 4. The electrodes 2 and 3 each have output conductor lugs 8, with FIG. 2 showing the positive output conductor lugs 8. These are connected to a collector 5, which is most preferably composed of the same material or substantially the same material as the output conductor lugs 8. In the case of positive electrodes, this material is aluminum, and in the case of negative electrodes it is copper.

Figure 2:
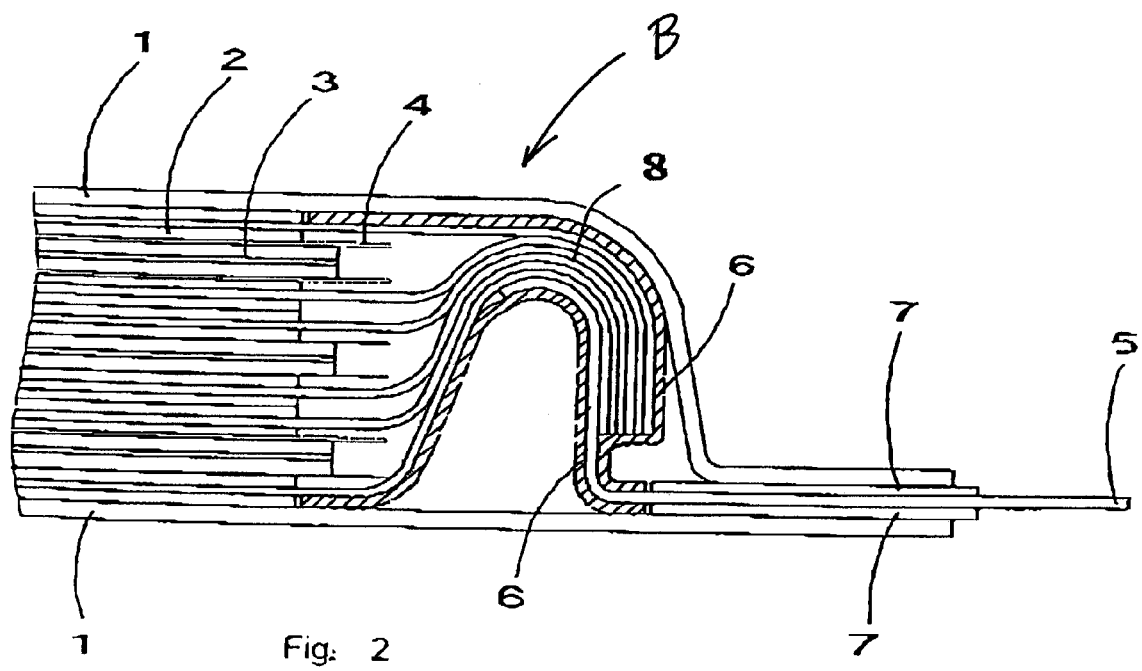
FIG. 2 is a partial sectional view of the positive output conductor area of the battery shown in FIG. 1, taken along the line A—A.

The output conductor lugs are folded closely together, as shown in FIG. 2 to achieve good utilization of the space and a correspondingly high energy density. In this case, considerable problems occur, in particular when the output conductor lugs 8 are composed of metal mesh, for example, aluminium metal mesh. Individual webs or small wires of the metal mesh can be produced by stamping out the electrode. High pressures and temperatures occur during the process of sealing the cell. During the process of sealing the cell, these webs or small wires can cut through the inner sealing layer of the composite sheet 1, which may be composed of polypropylene or ethylene acrylic acid copolymer. In the process, they can contact the metal of the composite sheet and, thus, cause a short circuit. Bends in the electrode output conductors 8 and in the area in which the output conductor 8 and the connector 5 are welded can also cut through the sealing film 7, which is arranged in the sealing area, during the sealing process. The sealing film 7 may be composed, for example, of polypropylene. As a consequence, connections can be formed from one pole to the housing, or connections can be formed on both sides between the poles and the housing and, particularly, in the last-mentioned case, lead to an internal short circuit.

Thus, according to aspects of the invention, that area which is located in the interior of the electrochemical element of those output conductors 8 which are adjacent to the housing wall 1 and the area of the weld to the collector 5 are covered by a high melting point plastic film 6. The plastic film 6 is adhesively bonded to the output conductor 8 and/or to the collector area. A plastic film which is suitable for this purpose may be composed of polyethylene, polypropylene, polyimide, polyethyleneterephthalate, PVC, PDFE or the like. Polyimide is preferably used as the plastic material. The plastic film 6 may, for example, have a thickness of about 20 to about 60 µm and is coated with a silicone material. The silicone material forms an adhesion layer with a high adhesion force and, like the material of the plastic film, is chemically compatible with and inert with respect to the components of the cell, in particular, with respect to organic carbonates and lithium conductive salts such as $LiPF_6$ and $LiBF_4$. The covering according to the invention of the output conductor and collector areas within the cell provides a high degree of reliability against short circuits and shorts to the casing during the production of lithium/polymer batteries, with little material being used and, thus, having little influence on the weight and volume of the cell. The specific energy densities of the cell remain virtually unchanged.

We claim:

1. An electrochemical element comprising:
   a housing comprising a metal sheet coated with an insulating material;
   two or more individual cells positioned in the housing as a stack and formed from positive and negative electrodes having output conductor connections and separators interposed between the positive and negative electrodes;
   collector connections extending outwardly of the housing; and
   output conductor connections of the same polarity each connected to one of the collector connections, wherein the output conductor connections are adjacent to the housing and the collector connection have areas oriented towards an inner face of the housing and are at least partially coated with a plastic layer.

2. The electrochemical element according to claim 1, wherein the plastic layer is a plastic film.

3. The electrochemical element according to claim 1, wherein at least one of the electrodes is a lithium-intercalating electrode.

4. The electrochemical element according to claim 1, wherein the plastic layer is adhesively bonded to the output conductor connection and the collector connection.

5. The electrochemical element according to claim 4, wherein the plastic layer is adhesively bonded to the output conductor connection and the collector connection by a silicone adhesive layer.

6. The electrochemical element according to claim 1, wherein the plastic layer has a thickness of about 20 µm to about 60 µm.

7. The electrochemical element according to claim 1, wherein the plastic layer comprises at least one material selected from the group consisting of PE, PP, PI, PET, PVC and PDFE.

8. The electrochemical element according to claim 7, wherein the plastic layer comprises PI.

9. The electrochemical element according to claim 1, wherein the positive electrode comprises aluminum.

10. The electrochemical element according to claim 1, wherein the negative electrode comprises copper.

11. The electrochemical element according to claim 1, wherein the output conductor connections comprises aluminum metal mesh.

12. The electrochemical element according to claim 1, further comprising a sealing film surrounding at least a portion of each of the collector connections at locations where the collector connections extend from the housing.

13. The electrochemical element according to claim 12, wherein the sealing film is polypropylene.

14. The electrochemical element according to claim 1, wherein the areas are completely coated with the plastic layer.

* * * * *